(12) United States Patent
Keltcher

(10) Patent No.: US 7,774,578 B2
(45) Date of Patent: Aug. 10, 2010

(54) APPARATUS AND METHOD OF PREFETCHING DATA IN RESPONSE TO A CACHE MISS

(75) Inventor: Paul S. Keltcher, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 268 days.

(21) Appl. No.: 11/448,337

(22) Filed: Jun. 7, 2006

(65) Prior Publication Data
US 2007/0288697 A1    Dec. 13, 2007

(51) Int. Cl.
G06F 12/00 (2006.01)
G06F 13/00 (2006.01)
G06F 13/28 (2006.01)

(52) U.S. Cl. ...................................... 711/213

(58) Field of Classification Search ............... None
See application file for complete search history.

(56) References Cited

U.S. PATENT DOCUMENTS

| | | | | |
|---|---|---|---|---|
| 5,966,726 A * | 10/1999 | Sokolov | ...................... | 711/113 |
| 6,157,993 A | 12/2000 | Lewchuk | | |
| 6,701,414 B2 * | 3/2004 | Abdallah et al. | ............. | 711/137 |
| 2002/0087800 A1 | 7/2002 | Abdallah et al. | | |
| 2002/0144062 A1* | 10/2002 | Nakamura | ................... | 711/137 |
| 2003/0154348 A1 | 8/2003 | Keltcher et al. | | |
| 2003/0188132 A1 | 10/2003 | Keltcher et al. | | |
| 2006/0059311 A1 | 3/2006 | Van De Waerdt et al. | | |

OTHER PUBLICATIONS

Hennessy and Patterson, Computer Architecture A Quantitative Approach, 3rd Ed, pp. 460-469.*
Hariprakash, G. et al., "DSTRIDE: Data-Cache Miss-Address-Based Stride Prefetching Scheme for Multimedia Processors", Computer Systems Architecture Conference, 2001, pp. 62-70.
International Search Report for PCT/US2007/008372 dated Aug. 10, 2007, 4 pgs.
Hu, Z. et al., "TCP: Tag Correlating Prefetchers," pp. 1-10.
Jouppi, N., "Improving Direct-Mapped Cache Performance by the Addition of a Small Fully-Associative Cache and Prefetch Buffers," 1990 IEEE, CH2887-8/90/0000/0364, pp. 388-397.
Joseph, D. et al., "Prefetching Using Markov Predictors," pp. 1-11.
Lai, A. et al., "Dead-Block Prediction & Dead-Block Correlating Prefetchers," 28th Annual Proceedings of International Symposium on Computer Architecture, 11 pages.
Nesbit, K. et al., "AC/DC: An Adaptive Data Cache Prefetcher," University of Wisconsin-Madison, Department of Electrical and Computer Engineering, 11 pages.

* cited by examiner

*Primary Examiner*—Christian P Chace
*Assistant Examiner*—Chad L Davidson

(57) ABSTRACT

A device and method is illustrated to prefetch information based on a location of an instruction that resulted in a cache miss during its execution. The prefetch information to be accessed is determined based on previous and current cache miss information. For example, information based on previous cache misses is stored at data records as prefetch information. This prefetch information includes location information based on an instruction that caused a previous cache miss, and is accessed to generate prefetch requests for a current cache miss. The prefetch information is updated based on current cache miss information.

20 Claims, 9 Drawing Sheets

APPARATUS AND METHOD OF PREFETCHING DATA IN RESPONSE TO A CACHE MISS

FIELD OF THE DISCLOSURE

The present application relates to determining data to be retrieved for use by a data processor, and more particularly to determining information to be prefetched for a data processor.

DESCRIPTION OF THE RELATED ART

Prefetching is a technique commonly implemented in computing devices having data processors, whereby data and instructions required by a processor are prefetched in anticipation of actually being needed by the processor. As a result of prefetching, information is available to the processor at a data rate that is limited by the relatively higher data rates of the processor's internal bus architecture as opposed to slower data rates associated with external memory devices. Therefore, since the prefetched information, which can be data and instructions, are available on chip to the processor when required, prefetching generally improves the processor's overall performance.

However, if prefetching is implemented incorrectly, prefetching may impair a processor or system's performance by prefetching information that is ultimately not needed by the processor. It is therefore appreciated that while a specific prefetch technique may be advantageous for one type of application, it may not be well suited for another. Therefore, a method and device for prefetching information that improves prefetching efficiency for a specific type of application would be useful.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with the present disclosure, prefetch information is accessed based on a location of an instruction that resulted in a cache miss during its execution. The prefetch information to be accessed is determined based on previous and current cache miss information. For example, information based on previous cache misses is stored at data records as prefetch information. This prefetch information includes location information for instructions causing the previous cache misses, and is accessed to generate prefetch requests for a current cache miss. In addition, the prefetch information is updated based on current cache miss information. Specific embodiment of the present disclosure will be better understood with reference to the figures herein FIGS. 1-19 herein.

Figure 1:
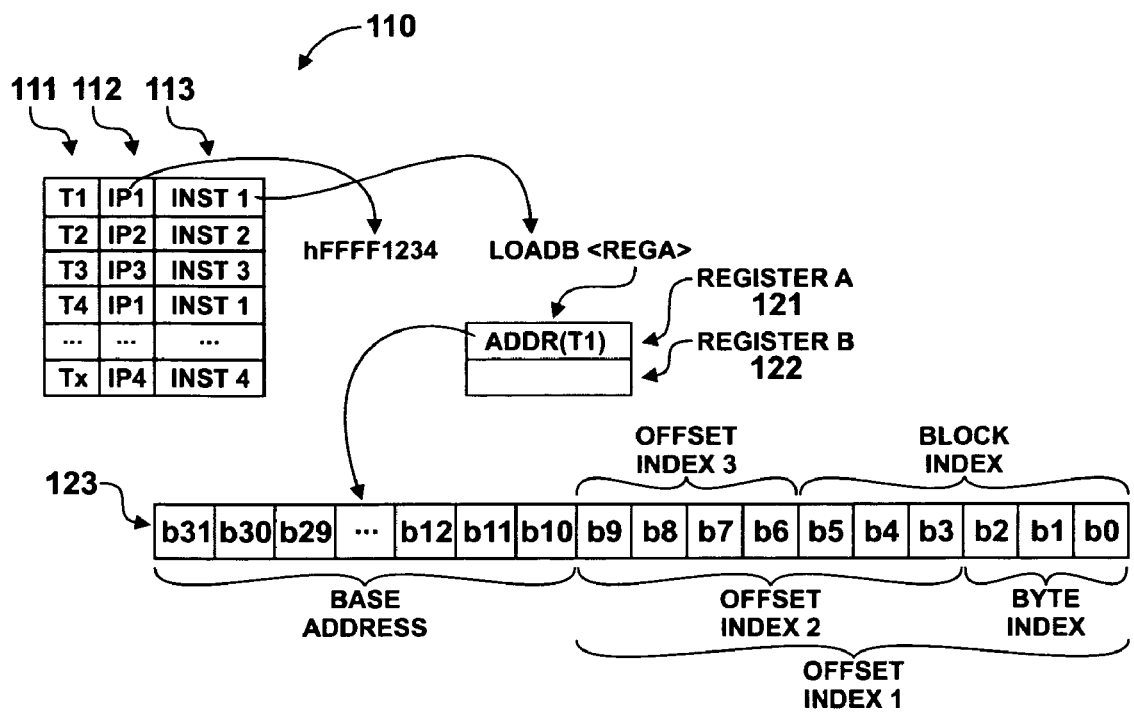
FIG. 1 illustrates various mnemonics associated with an address location being accessed by an instruction in accordance with a specific embodiment of the present disclosure.

A specific embodiment of the present disclosure will be discussed with reference to prefetch information that is stored as a result of executing a series of instructions. FIG. 1 includes an illustration of a table 110 having a plurality of rows, each row representing information associated with executing an instruction by a data processor. Column 111 of table 110 includes information indicative of an execution time of a corresponding instruction. Column 112 of table 110 includes information identifying an instruction pointer to a corresponding instruction. Column 113 of table 110 includes information identifying the executed instruction.

The information stored at column 111 is a time indicator representative of a relative order that a corresponding instruction is executed relative other instructions of table 110. Note that the numeric suffix of time indicator T2 indicates that INST2 is executed after INST1, which has a corresponding time indicator of T1. Note that it is not necessary that INST1 and INST2 be executed consecutively, i.e. without execution of intervening instructions.

The instruction pointer at column 112 indicates a location of its corresponding instruction. For example, the instruction INST1 executed at time T1 is illustrated in FIG. 1 as having a hexadecimal value of hFFFF1234. The instruction pointer can represent a location of any type memory space, including physical memory space, logical memory space, and the like.

INST1-INST4 are instructions that when executed result in cache misses being generated. For purposes of discussion herein it is assumed that all cache misses are the result of a load instruction having a mnemonic of LOADx. The suffix "x" in the load instruction mnemonic represents an alpha character having a value from A-Z that identifies a specific register. Therefore, the mnemonics LOADA and LOADB represent instructions that access information from memory to be stored at register A 121 and register B 122, respectively.

Execution of instructions INST1-INST4 can access memory locations using various addressing modes. Addressing modes specifically illustrated herein include a direct addressing mode and a register indirect addressing mode. The instruction "LOADB hADDR1" is an example of a load instruction using direct addressing mode, whereby hADDR1 is a hexadecimal number that identifies a memory location to be read and stored at register B 121. Note the "h" prefix indicates that the value Addr1 is a hexadecimal number. The instruction "LOADB <REGA>" is an example of a register indirect addressing mode, as represented by the "< >" symbols, whereby a value stored at the register within the "< >" symbols identifies a memory location from which information read and stored at register B 121.

For example, FIG. 1 includes an illustration whereby INST1 represents a LOADB instruction using a register indirect addressing mode. The mnemonic <REGA> identifies register A 121 as containing an address value from which information is to be read. The value at register A 121 is labeled ADDR(T1) to indicate the information stored at register A 121 represents an address location that was present at time T1 when instruction INST1 is being executed.

For purposes of discussion it is assumed that each byte of memory space is addressable by a 32-bit value. A prefix "h" is used to represent hexadecimal numbers herein. Therefore, the value stored at register A 121 in FIG. 1 is a 32-bit value having a most significant bit (b31) and a least significant bit (b0) as indicated by the bit order reference 123.

Associating specific mnemonics with portions of the bits b31-b0 that represent each memory location will further facilitate discussion herein. It will be appreciated that a data processor system can have a minimum number of bytes that are accessed with each memory access. For purposes of discussion herein it is assumed that four bytes are accessed at a time. Therefore, a minimum access block includes the bytes associated with an aligned four-byte region. Each byte of the four byte regions is identified by a byte index, which in the present example includes the two least-significant-bits (LSBs) of an address location. As further illustrated in FIG. 1, the term "base address" refers to a determined number of most-significant-bits (MSBs) of each 32-bit memory location that provides an index value identifying an aligned region within memory. As illustrated, the 22-bit base address of FIG. 1 includes the upper 22 MSBs (b21-b10) of each address location (b21-b10). Therefore, each unique 22-bit Base Address value will identify the first byte of an address aligned memory region. The term "address aligned memory region" refers to an aligned region of memory that is aligned (e.g., starts) at a recurring offset, such as at every one-kilobyte ($2^{10}$) region of memory (e.g., h0, h400, h800, hC00, etc.) based upon the address values. Another aligned memory region discussed herein is a center block aligned memory region that refers to a scheme that uses positive and negative index values to reference blocks of memory relative to a specific memory block that is in affect centered.

An offset, is used to index or address one or more specific bytes within an aligned region. For example, a ten-bit offset index (offset index1) can be used to identify any one byte within a one-kilobyte region. In an alternate embodiment, an offset index can be used to identify the first byte of block of bytes within the larger aligned region. For example, offset index2 is an eight-bit offset index that can be used to identify a specific the minimum access block within a one-kilobyte region. Similarly, offset index3 is a four-bit offset that can be used to identify the first byte of a 64-byte block of memory within the one-kilobyte region that corresponds to a cache line size. For example, assuming each data request to memory results in a 64-byte cache line being filled, bits b5-b0 (block index) would be used to identify a specific byte within the cache line, while a specific value of offset index3 would index one of 16 64-byte regions within a one-kilobyte aligned region defined by the 22-bit base address.

In an alternate embodiment, an index training prefetch information based on the same set of instructions described at FIGS. 3-7, whereby the block offsets are relative to center location representing a block that resulted in a cache miss. The location is referred to as a center location because both positive and negative offsets can be accommodated.

Figure 2:
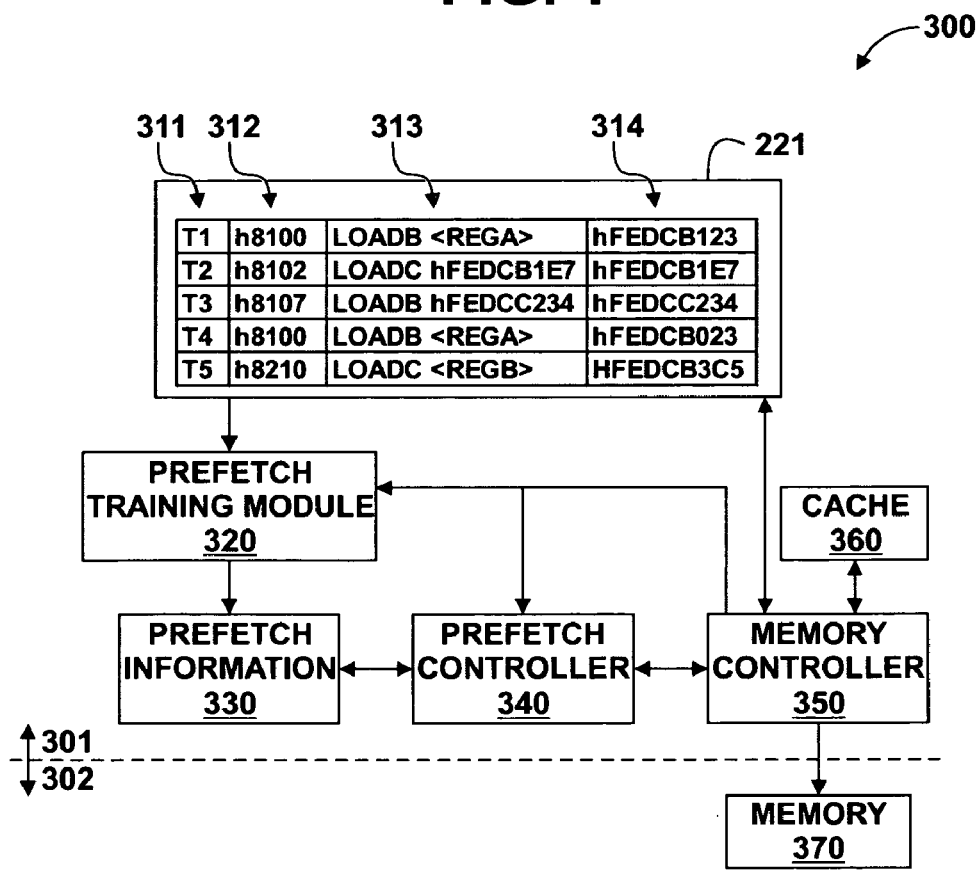
FIG. 2 illustrates a device in accordance with a specific embodiment of the present disclosure.

FIG. 2 illustrates a system 300 in accordance with the present disclosure. The system 300 includes: data processor 310 that executes the instructions indicated at table 221; a prefetch training module coupled to receive information from the data processor 310 and to provide prefetch information; a storage location 330 to receive and store prefetch information from prefetch training module 320; prefetch controller 340 to provide prefetch requests based on information at storage location 330; a memory controller 350 to receive memory access request information from the data processor 310, memory prefetch requests from the prefetch controller 340, to provide memory requests to memory 370, and a cache miss indicator to the prefetch training module 320 and prefetch control module; a cache 360 to receive and provide information requested from memory controller 350. In the specific embodiment of FIG. 2, a boundary is indicated between an integrated circuit device 301 and external components 302.

Within data processor 310, a table 231 is illustrated whereby each row of table 311 represents an instruction executed by data processor 310. Each row of table 311 identifies an instruction pointer at column 312 indicating an instruction location, an instruction pointed to by the instruction pointer is listed at column 313, a time sequence indicator is listed at column 311 that indicates the order of execution of each instruction relative the other instructions of table 231, and an address at column 314 that indicates a memory location being accessed by the listed instruction.

In operation, data processor 310 provides address information to memory controller 350 that identifies memory locations containing information needed to complete execution of a specific instruction. Memory controller 350 will provide the information from either cache 360, when the information at requested address is represented in cache 360, or from memory 370. Memory controller 350 will provide a cache miss when the requested information is not available at cache 360. Once retrieved, information requested by data processor 310 is provided to processor 310 and to cache 360. It will be appreciated that memory controller 350 will typically fill entire cache lines of cache 360 with information at address locations adjacent to the address containing information needed by data processor 310. For purposes of discussion it is assumed that each cache line of cache 360 is 64-bytes in length.

In response to receiving a cache miss from memory controller 350, the prefetch controller will determine, based on the prefetch information at storage location 330, whether there is additional information to be prefetched as a result of the cache miss. In accordance with a specific embodiment herein, the instruction pointer of the instruction causing the cache miss is used to determine if there is relevant prefetch information at storage location 330. Note that storage location 330 typically resides on the same integrated circuit device as the prefetch controller to reduce latency when generating prefetch requests. In one embodiment, the portion of storage location 330 containing records represented in table 231 can be a content addressable memory that is accessed using the instruction pointer of the instruction causing the current cache miss. The prefetch controller 340 will provide prefetch address information to memory controller 350 based on information stored at storage location 330 when storage location 330 contains an entry associated with the instruction causing the cache miss. As a result, memory controller 350 will determine if the information being requested from the prefetch controller is already in cache 360. If not, memory controller 350 will retrieve information from memory 370 to fill an additional cache line of cache 360. Operation of the prefetch training module, and how table 311 information is determined will be discussed further with reference to FIGS. 3-7, which illustrate a specific example the training of the prefetch information at storage location 330.

Each of FIGS. 3-7 illustrate training of prefetch information at storage location 330 in response to cache misses resulting from instructions of table 221 being executed at data processor 310. Each of FIGS. 3-7 includes a bottom row of table 221 containing a current instruction causing a current cache miss, an instruction at column 312 currently being executed, and previously executed instructions, if any. In addition each of FIGS. 3-7 illustrates prefetch information being provided by the prefetch training module 320 to table 331 at storage location 330. Prefetch information being stored at storage location 330 is represented in tabular form at table 331, whereby each row represents an information record containing information associated with a cache miss. The memory address causing the cache miss is identified by a miss base address at column 411 and a miss offset at column 413. For purposes of discussion, the miss base address is a 22-bit index that identifies a one-kilobyte aligned region within memory space. Therefore, for 32-bit addresses, each miss base address value is represented by 22-bit hexadecimal number representing the 22 most significant bits of the address causing the miss (the miss address). A miss offset value stored at column 413 is a 10-bit number representing an offset into a 1-kilobit region identified by the miss base address. The instruction pointer (IP) value is stored at column 412 that identifies the location of the instruction that caused the cache miss. Prefetch information used to identify memory locations to be prefetched is stored in a match bit array at column 414. A match counter is maintained at column 415.

The number of records in table 331 for storing prefetch information can be fixed or variable. In one embodiment, storage location is a fixed storage location at a semiconductor device that includes modules on an integrated circuit device represented by 301 in FIG. 2.

Figure 3:
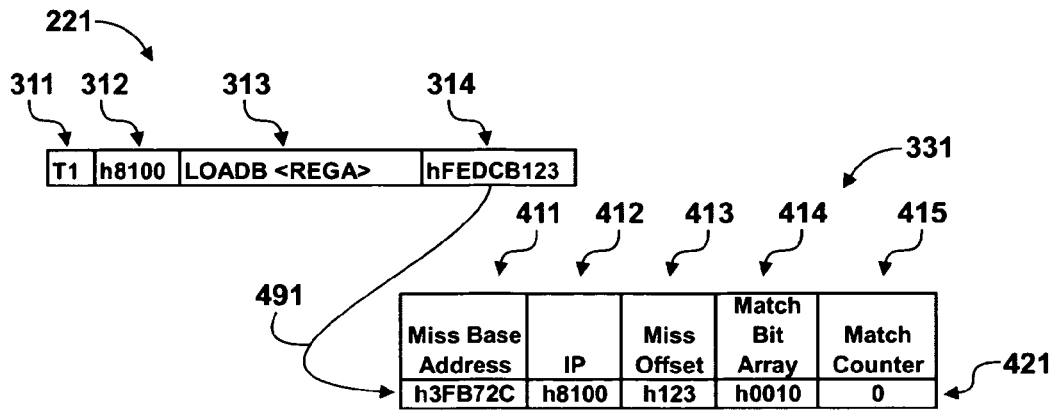
FIGS. 3-7 illustrate the effect of executing instructions on prefetch information in accordance with the present disclosure.

FIG. 3 includes an illustration of the affects of a cache miss caused by execution of instruction LOADB <REGA> at time T1. Specifically, the cache miss at time T1 results in a new record being created at row 421 of table 331. Information representing the instruction pointer to instruction LOADB <REGA> which is responsible for the cache miss at time T1 is stored at column 412/row 421 of table 331. Information representing the miss address that was not represented in cache 360, and therefore caused the miss at time T1, is stored at column 411 as a miss base address, and at column 413 as a miss offset. For example, a 22-bit miss base address (h3FB72C) that includes the 22 most significant bits of the miss address (hFEDCB123) is stored at column 411/row 421 of table 331. The miss base address value identifies a one-kilobyte aligned region of memory. The start of a one-kilobyte region in memory can be determined multiplying the miss base address (h3FB72C) by h400, thereby adding ten zeros as LSBs to the miss base address. For example, h3FB72C×h400=hFEDCB000.

The remaining 10 bits of the address causing the cache miss are stored as a miss offset at column 413/row 421. Note that the number of bits needed to represent the miss offset can differ as previously discussed. For example, if it is assumed that memory is accessed four bytes at a time, only 8 of the 10-bits are needed to identify the location of memory containing the memory location causing the cache miss, thereby alleviating the need to maintain a 10 bit offset. Similarly, only a four bit offset value is needed to identify one of the 16 possible cache line locations within an aligned one-kilobit memory region. For example a miss offset of 0 would begin accessing memory at the first byte of the one-kilobyte aligned region while a miss offset of 1 would begin accessing memory at the 65$^{th}$ byte of the one-kilobyte region A value is stored at the match bit array at column 414/row 421 to identify a 64-byte block of a one-kilobyte aligned region (identified by the value of the miss base address) that contains the memory location that caused the cache miss at time T1. In one embodiment the match bit array stores a 16-bit value, with each bit (b15-b0) of the 16-bit value corresponding to one of sixteen 64-bit blocks of data that make up a one-kilobyte region, as previously discussed. For example, the bit corresponding to the miss offset h123 of column 413/row 421 is determined by right shifting the miss offset value by 6-bits. For example, shifting the value h123 by 6 bits results in a hexadecimal value of h0010, which corresponds to the binary value of 0000 0000 0001 0000. The effect is that the fifth bit (b4) of the match bit array is set to indicate that the memory address that caused the miss at time T1 is located at the fifth 64-bit block of a one-kilobyte aligned region.

A counter at column 415 of row 421 is set to zero to indicate that the match bit array information has not been updated by subsequent cache misses.

Figure 4:
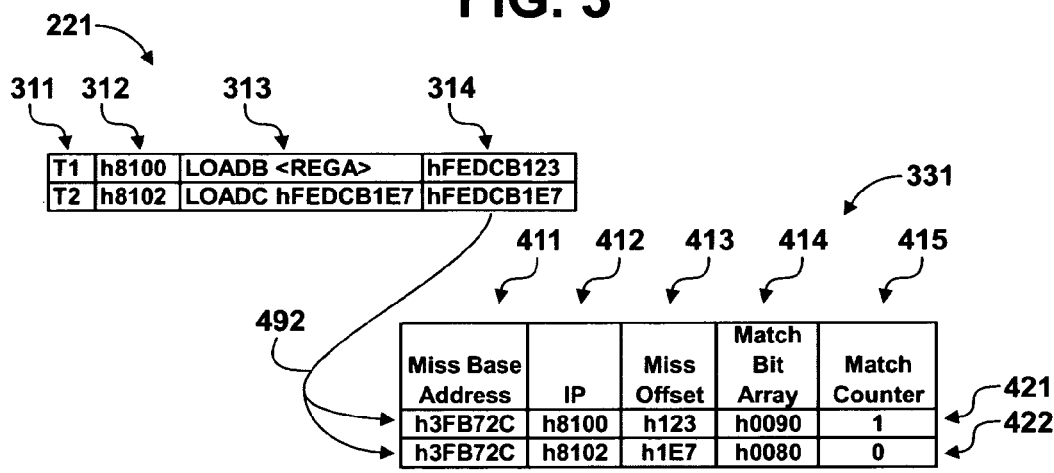

FIG. 4 includes an illustration of information provided by cache prefetch training module 320 to table 331 in response to a cache miss associated with the execution of instruction LOADC hFEDCB1E7 at time T2. Arrow 492 of FIG. 4 points to rows representing records affected by the current cache miss, which includes the record represented by row 421 and a new record represented by row 422.

Information representing the instruction pointer to the instruction responsible for the cache miss at time T2 is stored at column 412/row 422. Information representing the address location (hFEDCB1E7) being accessed by the instruction that caused the miss at time T2 is stored at column 411/row 422 as a miss base address (H3fb72c), and at column 413/row 422 as a ten-bit miss offset (h1E7).

A value of the match bit array at column 414/row 422 is stored to indicate a 64-byte block of a one-kilobyte aligned region (identified by the value of the miss base address) that contains the memory location that caused the cache miss at time T2. The 64-byte block corresponding to the miss offset h1E7 of row 421 is the 7$^{th}$ bit (b6) resulting in a match bit array value of h0080 being stored at column 414/row 422 as a result of the cache miss at time T2.

A counter at column 415/row 422 is set to zero to indicate that the match bit array information has not yet been updated by subsequent cache misses.

Each new cache miss also results in each existing record of table 331 being evaluated to determine if any of the previously stored records have a have a miss base address corresponding to the same one-kilobyte aligned regions. For example, since row 421 and row 422 have the same base miss address value (h2FB72C) it is determined that the memory being access that caused both of their cache misses is stored in the same one-kilobyte aligned region. Therefore, a previous match bit array will be updated in response to the current (T2) miss base address matching a previous miss base address. For example, information is stored at the previous miss base address at column 414/row 421 by ORing the value of the current match bit array and the previous miss bit array. For example, as a result of the cache miss at time T2 information is provided form the prefetch training module to update the value of the match bit array for row 421 to the value h0090 (h0010 OR h0080).

The counter value at column 415 of row 421 is incremented to one to indicate that the match bit array information was updated as a result of the current miss.

Figure 5:
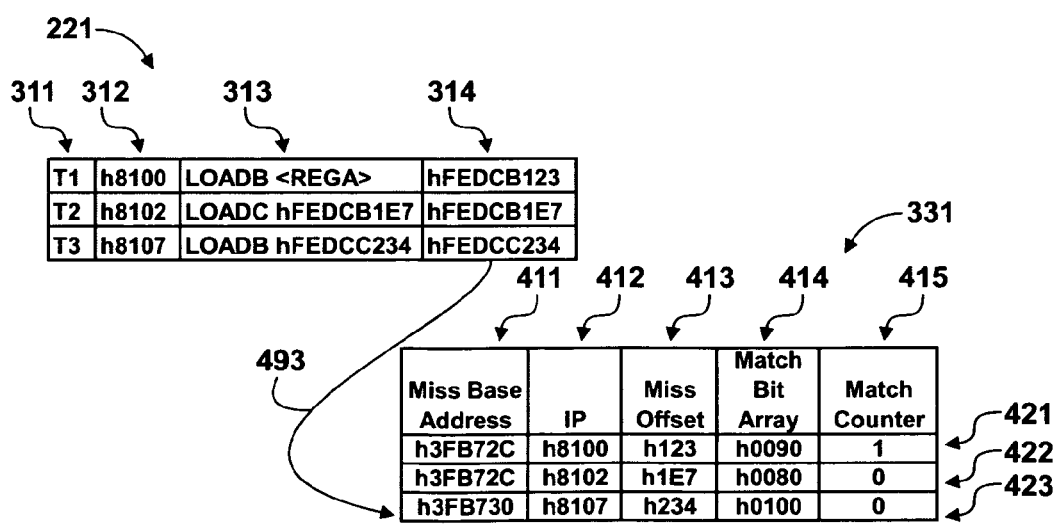

FIG. 5 includes an illustration of information provided by cache prefetch training module 320 to table 331 in response to a cache miss associated with the execution of instruction LOADB hFEDCC234 at time T3. Arrow 493 of FIG. 5 points to the records affected by the current cache miss, which only includes new record represented by row 423.

Information representing the instruction pointer to the instruction responsible for the cache miss at time T3 is stored at column 412/row 423 of table 331. Information representing the address location (hFEDCC234) being accessed by the instruction that caused the miss at time T3 is stored at column 411/row 423 as a miss base address (H3FB730), and at column 413/row 423 as a ten-bit miss offset (h234).

A value of the match bit array at column 414 of row 423 is stored to indicate a 64-byte block of a one-kilobyte aligned region (identified by the value of the miss base address) that contains the memory location that caused the cache miss at time T3. The 64-bit block corresponding to the miss offset h234 of row 421 is the $9^{th}$ bit (b8) resulting in a match bit array value of h0100 being stored at column 414 of row 423 as a result of the cache miss at time T3.

A counter at column 415 of row 423 is set to zero to indicate that the match bit array information has not yet been updated by subsequent cache misses.

Because the address that caused the cache miss at time T3 does not have the same miss base address of any other record in table 331, the cache miss at time T3 does not affects any of the other records of table 331.

Figure 6:
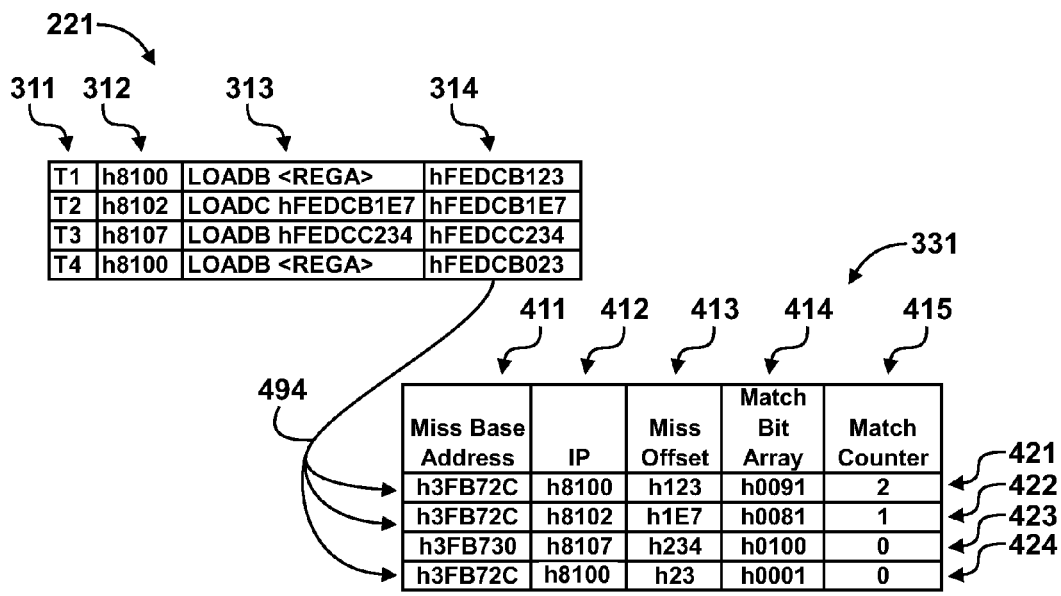

FIG. 6 includes an illustration of information provided by cache prefetch training module 320 to table 331 in response to a cache miss associated with the execution of instruction LOADB <REGA> at time T4. Arrow 494 of FIG. 6 points to the records affected by the current cache miss, which includes the records represented by rows 421 and 422, and a new record represented by row 424.

Information representing the instruction pointer to the instruction responsible for the cache miss at time T4 is stored at column 412/row 424. Information representing the address location (hFEDCC234) being accessed by the instruction that caused the miss at time T4 is stored at column 411/row 424 as a miss base address (h3FB72C) and at column 413/row 424 as a ten-bit miss offset (h23).

A value is stored at the match bit array at column 414/row 424 to indicate the location of a 64-byte block within a one-kilobyte aligned region containing the memory location that caused the cache miss at time T4. The bit corresponding to a 64-byte block containing the miss offset h23 is the $1^{st}$ bit (b0) resulting in a match bit array value of h0001 being stored at column 414/row 424 as a result of the cache miss at time T4.

A counter at column 415 of row 424 is set to zero to indicate that the match bit array information has not yet been updated by subsequent cache misses.

The cache miss at time T4 also results in two existing records of table 330 updated with additional prefetch information as a result of these records having the same one-kilobyte aligned region index. For example, prefetch information at column 414/row 421 and column 414/row 422 need to be updated since both have the same miss address value (h3FB72C) row 424, which represents the current cache miss. Therefore, the match bit array of column 414/row 421 is updated to h0091, and the match bit array of column 414/row 422 is updated to 0081. It will be appreciated that updating the prefetch information of row 421 and row 422 occurs because if the information needed at time T4 had been prefetched at either T1 or time T2 the cache miss at time T4 would have been avoided. This will be discussed further herein with respect to a different embodiment.

The counter values at column 415 of rows 421 and 422 are incremented by one to indicate a number of updates to the match bit array information of each row as a result of the current miss.

Figure 7:
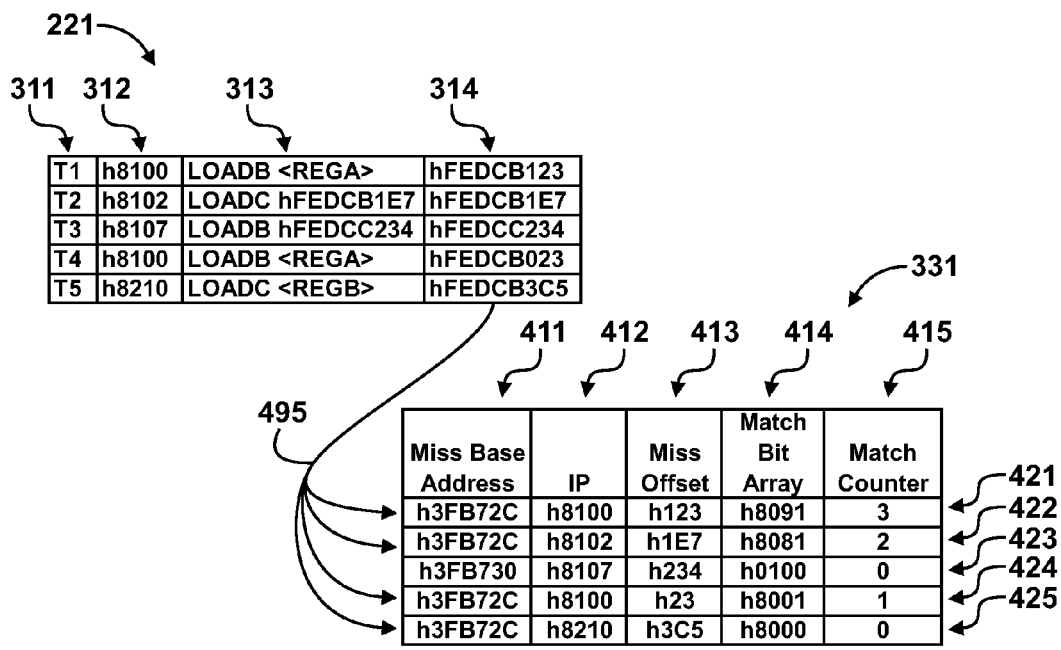

FIG. 7 includes an illustration of information provided by cache prefetch training module 320 to table 331 in response to a cache miss associated with the execution of instruction LOADC <REGB> at time T5. Arrow 495 of FIG. 7 points to the records affected by the current cache miss, which include the records represented by rows 421, 422, 424, and a new record represented by row 425.

Information representing the instruction pointer to the instruction responsible for the cache miss at time T5 is stored at column 412/row 425. Information representing the address location (HFEDCB3C5) being accessed by the instruction that caused the miss at time T5 is stored at column 411/row 425 as a miss base address (h3FB72C) and at column 413/row 425 as a ten-bit miss offset (h3C5).

A value is stored at the match bit array column 414/row 424 to indicate the 64-byte block of a one-kilobyte aligned region that contains the memory location that caused the cache miss at time T5. The 64-bit block corresponding to the miss offset h3CF of row 421 is the $16^{th}$ bit (b15), which results in a match bit array value of h8000 being stored at column 414/row 425 as a result of the cache miss at time T5.

A counter at column 415/row 425 is set to zero to indicate that the match bit array information has not yet been updated by subsequent cache misses.

Each cache miss also results in each existing record of table 330 being evaluated to determine if any of the previously stored records have a match bit array corresponding to the same one-kilobyte aligned regions. In the present example, prefetch information at rows 421, 422, and 424 needs to be updated since each of these rows have the same miss address value (h3FB72C) as row 425, which represents the current cache miss. Therefore, the match bit array of row 421 is updated to h8091, the match bit array of row 422 is updated to 8081, and the match bit array of row 424 is updated to h8000.

The counter values at column 415 of rows 421, 422, and 424 are incremented by one to indicate a number of updates to the match bit array information of each row as a result of the current miss.

Figure 8:
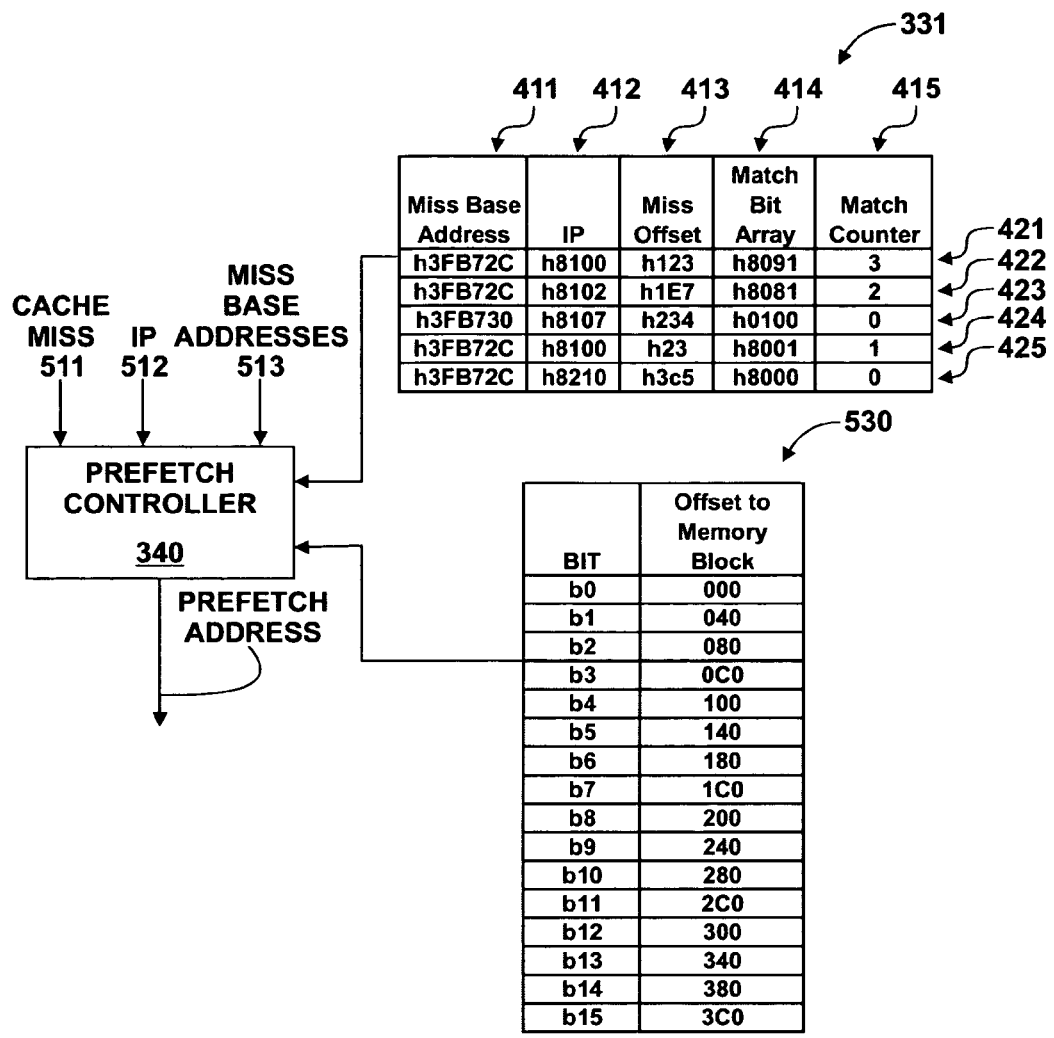
FIG. 8 illustrates one embodiment of the prefetch controller of FIG. 2 in greater detail.

Operation of prefetch controller 340 is discussed with reference to FIG. 8. For purposes of illustration, it is assumed that the prefetch information described at FIG. 7 is the current set of prefetch information at the time a new cache miss occurs. FIG. 8 illustrates prefetch controller 340 receiving a cache miss indicator 511, an instruction pointer 512 to the instruction causing the cache miss indicator 511 to occur, and a miss base address of the memory location causing the cache miss.

In response to receiving a cache miss indicator, the prefetch controller 340 will determine whether prefetch information at storage location 330 includes a record associated with the instruction pointer causing the current cache miss. For example, no prefetch information would be found in table 331 in response to receiving a cache miss indicator that was generated as a result of executing an instruction having an instruction pointer h8111 because this instruction pointer is not represented in table 331. However, if the cache miss is generated as a result of executing an instruction at instruction pointer h8100 the prefetch controller would find two entries (see rows 421 and 424) of prefetch information in table 331. The prefetch controller 340 can use the oldest entry, i.e., the entry represented by column 414/row 421, to issue prefetch requests to memory controller 350.

Prefetch requests from prefetch controller 340 include providing a memory address associated with a specific block of memory from which memory was previously accessed. Since each set bit of the match bit array of column 414/row 421 corresponds to a 64-bit block of memory, the prefetch controller will provide four memory prefetch requests to memory controller 350. For example, the match bit array value h8091 at row 491 has set four bits (b15, b8, b4, and b0) corresponding to four blocks of memory from which data was previously accessed. Therefore, the prefetch controller will provide four memory addresses, one for each of the four blocks, to memory controller 350. The prefetch controller 340 can provide any address within the 64-byte block to the memory controller 360 to prefetch all 64-bytes of the corresponding block. The first byte of a memory block corresponding to a bit set in the match bit array can be determined by left shifting a corresponding miss base array value by ten bits, and adding this result to the offset from table 530 of FIG. 8 that corresponds to the set bit. Therefore, for the match bit array value of h8091, the prefetch controller can request address locations offset from the first byte of a one-kilobyte boundaries by h000 (b0), h100 (b4), h200 (b8), and h3C0 (b15).

Figures 9, 10:
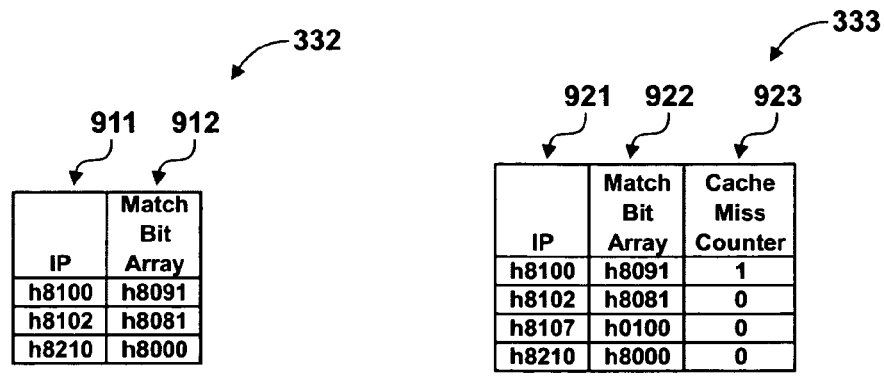
FIGS. 9 and 10 illustrate tables representing specific embodiments for storing data.

In one embodiment of the present disclosure, the one-kilobyte boundary used to generate the prefetch request is the current miss base address received at the prefetch controller 340. Therefore, referring to FIG. 8, if the miss base address 513 has a 22-bit value of hCFFFFF, the prefetch controller 340 will provide address values of FFFFFC00 (b0), FFFFFD00 (b4), FFFFFDC0 (B8), and FFFFFFC0 (b15) to the memory controller 350. These address values will result in four cache lines being prefetched by memory controller 350, assuming they are not currently in cache 360. Note that blocks of memory being prefetched can be non-sequential regions of memory, as opposed to prefetching one larger region of memory that would include sequential blocks of memory It is noted that while the miss base address information at column 411 of table 331 is needed during prefetch training to determine which subsequent cache misses are at a common one-kilobyte region of memory, the miss base address information is not needed by the prefetch controller, which uses the miss base address of the current cache miss to generate prefetch addresses. Therefore, a different table can be maintained for use by prefetch controller 340 to generate prefetch requests. FIG. 9 illustrates a table 332 that can also be stored at storage location 330, which contains prefetch information for use by the prefetch controller 340. Specifically, instruction pointer information is stored at column 511 and match bit array information is stored at column 512 of table 332. Instead of maintaining multiple records for each instruction pointer value, table 332 contains only one record a given instruction pointer. This allows table 332 to represent a content addressable memory that is accessed by the prefetch controller when a cache miss occurs using the instruction pointer value responsible for the current cache miss. If a request to the content addressable memory identifies a matching instruction pointer at column 511 its corresponding match bit array is used by the prefetch controller 340 to provide prefetch addresses to memory controller 350.

FIG. 10 illustrates an alternate embodiment of a table 333 that can be used instead of table 332 to store prefetch information used by prefetch controller 340. Columns 521 and 522 correspond to columns 511 and 512, as previously described. Table 333, however, includes column 523 to maintain a cache miss counter. The cache miss counter value indicates the number of times the prefetch controller has generated prefetch requests using a specific record in response to a cache miss. Therefore, the cache miss counter for a record is incremented each time its match bit array information is used to generate prefetch requests.

It will be appreciated that other offset schemes can be used beside that previously described, whereby the block offsets are relative to the beginning of an aligned region that is based upon one-kilobyte memory boundary as defined by the upper 22-bits of a 32 bit address. For example, FIGS. 11-15 illustrate an alternate embodiment of training prefetch information based on the same set of instructions described at FIGS. 3-7, whereby the block offsets are relative to center location representing a block that resulted in a cache miss. The location is referred to as a center location because both positive and negative offsets can be accommodated.

Referring to FIGS. 11-15, prefetch information being stored at storage location 330 is represented in tabular form at table 341, whereby each row represents an information record containing information associated with a cache miss. Columns 441-443, and 445 store information as previously described with respect to columns 341-343, and 345. Column 444 stores prefetch information within an aligned region that is centered at a block of memory containing an address responsible for the cache miss. Therefore, the 8 MSBs of each entry in row 444 of table 341 represent one of eight 64-byte blocks of data prior to a centered block, and the 8 LSBs of each entry in row 444 represent one of eight 64-byte blocks of data after the centered 65-byte block.

Figure 11:
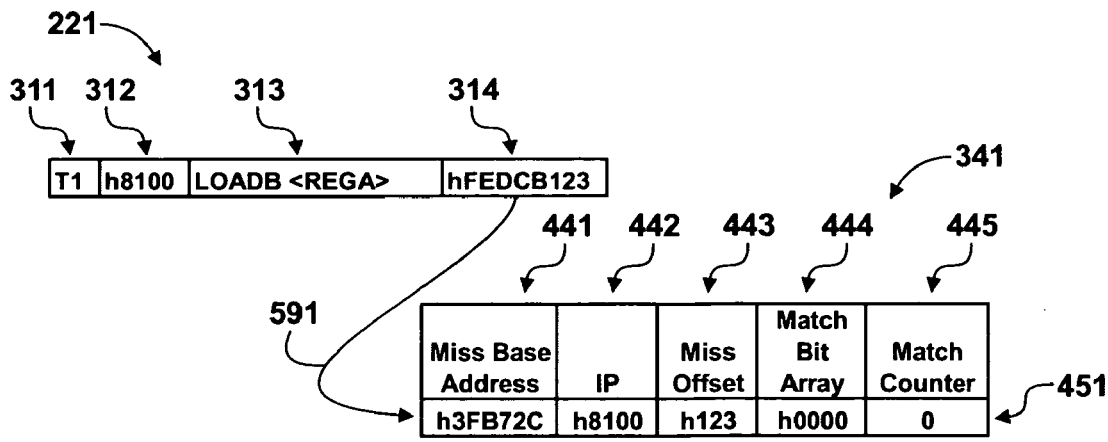
FIGS. 11-15 illustrate the effect of executing instructions on prefetch information in accordance with the present disclosure.

Referring to FIG. 11, the match bit array at column 444/row 451 is cleared, e.g., all bits set to zero, in response to the instruction LOADB <REGA> being executed at time T1. Note that the match bit array is cleared when an entry is created, because the 64-byte block of data containing the address that resulted in the miss, e.g., hFEDCB123 in FIG. 11, will be the reference from which other block offsets representing prefetch information will be determined.

Figure 12:
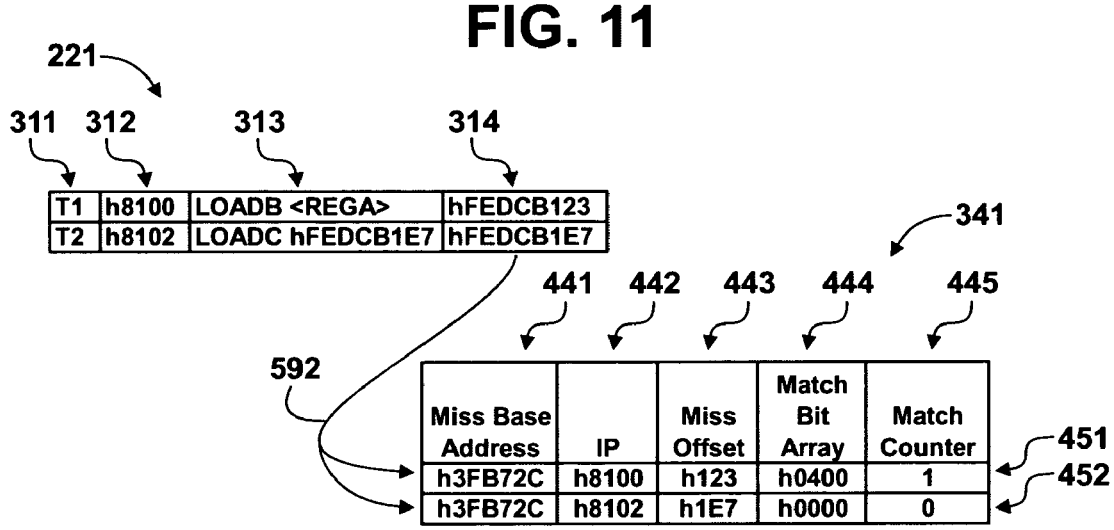

Referring to FIG. 12, the match bit array at row 452 is cleared, e.g., all bits set to zero, in response to the instruction being executed at time T2 causing a cache miss, and the information at row 451 of table 341 is evaluated to determine if its prefetch information is to be updated. With respect to the present embodiment, the prefetch information for a specific row will be updated if memory location causing the current cache miss is within eight 64-byte memory blocks (i.e. +−512 bytes). This can be determined by the equation: (current miss address right-shifted by 6-bits)−(miss address of row being evaluated shifted by 6-bits). Therefore, with respect to FIG. 12, the memory location (hFEDCB1E7) causing the current cache miss has a block offset of +h3 ((hFEDCB1E7 right shifted by 6−hFEDCB123 Right shifted by 6)) relative to the memory location (hFEDCB123) causing the cache miss at row 451. Therefore, the third bit to the left of a center location, i.e., the 11$^{th}$ MSB (b10), of the match bit array for row 451 is set, since the address causing the cache miss at row 452 was within 512 bytes of the address causing the cache miss at row 451, resulting in a match bit array value of h400 at 451.

Figure 13:
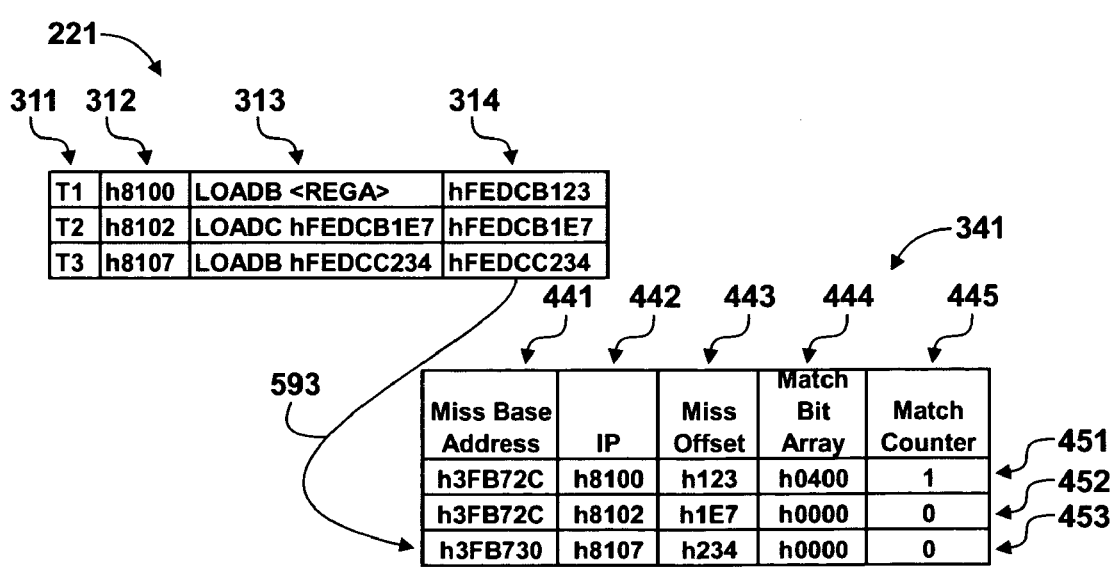

Referring to FIG. 13, the match bit array at row 453 is cleared, e.g., all bits set to zero, in response to the instruction being executed at time T3 causing a cache miss, and the information at rows 451 and 452 of table 341 is evaluated to determine if there is prefetch information to be updated as discussed with respect to FIG. 12. An evaluation of the miss location of row 451 (hFEDCB123) to the miss location of row 453 (hFEDCC234) reveals that the miss location of row 453 is offset from the miss location of row 451 by −44 blocks. Therefore, the match bit array of row 453 is not within 8 blocks of a centered block of row 451, and the match bit array value at row 451 is not updated with additional prefetch information. An evaluation of the miss location of row 452 (hFEDCB1E7) to the miss location of row 453 reveals (hFEDCC234) that the miss location of row 453 is offset from the miss location of row 452 by −+41 blocks. Therefore, the match bit array of row 453 is not within 8 blocks of the match bit array of row 452, and the match bit array value at row 452 is not updated with additional prefetch information.

Figure 14:
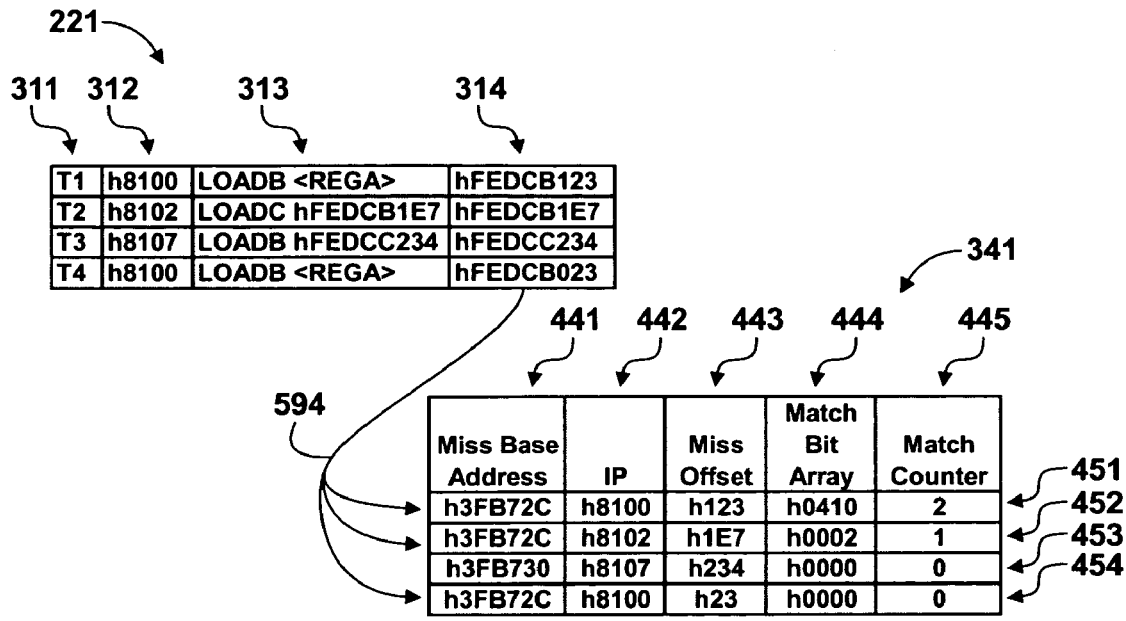

Referring to FIG. 14, the match bit array at row 454 is cleared, e.g., all bits set to zero, in response to the instruction being executed at time T4 causing a cache miss, and the information at rows 451-453 of table 341 is evaluated to determine if there is prefetch information to be updated as discussed with respect to FIG. 12. An evaluation of the miss location of row 451 (hFEDCB123) to the miss location of row 454 (hFEDCB023) reveals that the miss location of row 454 is offset from the miss location of row 451 by −h4 blocks. Because the miss locations are within four blocks of each other, the match bit array at row 451 is updated with additional prefetch information by setting the fourth bit (b4) to the right of a center location of the match bit array. This results in a value of h410 being stored at the match bit array of row 451. An evaluation of the miss location of row 452 (hFEDCB1E7) to the miss location of row 454 (hFEDCB023) reveals that the miss location of row 454 is offset from the miss location of row 452 by −h7 blocks. Because the miss locations are within eight blocks of each other, the match bit array of row 452 is updated with additional prefetch information by setting the $7^{th}$ bit (b1) to the right of a center location of the match bit array. This results in a value of h0002 being stored at the match bit array of row 452. An evaluation of the miss location of row 453 (hFEDCC234) to the miss location of row 454 (hFEDCB023) reveals that the miss location of row 454 is offset from the miss location of row 453 of more than 8 blocks, and therefore has no effect on the match bit array value of row 453.

Figure 15:
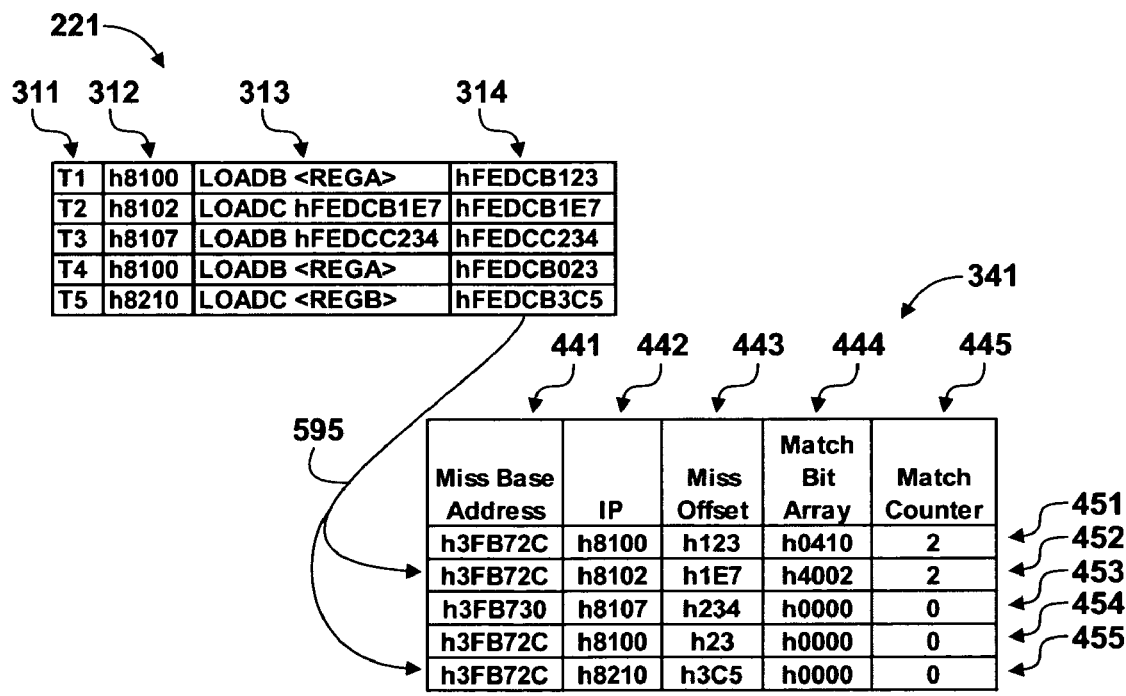

Referring to FIG. 15, the match bit array at row 455 is cleared, e.g., all bits set to zero, in response to the instruction being executed at time T5, and the information at rows 451-454 of table 341 is evaluated to determine if there is prefetch information to be updated as discussed with respect to FIG. 12. An evaluation of the miss location of row 451 (hFEDCB123) to the miss location of row 455 (hFEDCB3C5) reveals that the miss location of row 455 is offset from the miss location of row 451 by +hA blocks and therefore has no effect on the match bit array value of row 451 because it is not within eight blocks. An evaluation of the miss location of row 452 (hFEDCB1E7) to the miss location of row 455 (hFEDCB3C5) reveals that the miss location of row 454 is offset from the miss location of row 452 by +h7 blocks. Because the miss locations are within eight blocks of each other, the match bit array of row 452 is updated with additional prefetch information by setting the $7^{th}$ bit (b14) to the left of a center location of the match bit array at row 452. This results in a value of h4002 (minor change to FIG. 15) being stored at the match bit array of row 452. An evaluation of the miss location of row 453 (hFEDCC234) to the miss location of row 455 (hFEDCB3C5) reveals that the miss location of row 455 is offset from the miss location of row 453 of more than 8 blocks, and therefore has no effect on the match bit array value of row 453. An evaluation of the miss location of row 453 (hFEDCC234) to the miss location of row 455 (hFEDCB3C5) reveals that the miss location of row 454 is offset from the miss location of row 453 of more than 8 blocks, and therefore has no effect on the match bit array value of row 453. An evaluation of the miss location of row 454 (hFEDCB023) to the miss location of row 455 (hFEDCB3C5) reveals that the miss location of row 455 is offset from the miss location of row 451 by +hE blocks and therefore has no effect on the match bit array value of row 454.

Operation of prefetch controller 340 is discussed with reference to FIG. 16. For purposes of illustration, it is assumed that the prefetch information described at table FIG. 15 is the current set of prefetch information at the time a new cache miss occurs. FIG. 15 illustrates prefetch controller 340 receiving a cache miss indicator 611, an instruction pointer 612 to the instruction causing the cache miss indicator 511 to occur, and a miss address of the memory location causing the cache miss.

In response to receiving a cache miss indicator, the prefetch controller 340 will determine whether prefetch information at storage location 330 includes a record associated with the instruction pointer causing the current cache miss. For example, no prefetch information would be found in table 341 in response to receiving a cache miss indicator that was generated as a result of executing an instruction having an instruction pointer (IP) value of h8111 because this instruction pointer is not represented in table 341. However, the prefetch controller would find two entries (see rows 451 and 454) of prefetch information in table 331 if a cache miss is generated as a result of executing an instruction at instruction pointer h8100. The prefetch controller 340 can use the oldest entry, i.e., the entry represented by column 414/row 421, to issue prefetch requests to memory controller 350. Note, in an alternate embodiment, only one entry is maintained for each instruction pointer as discussed with reference to FIG. 10 previously, and further discussed below.

Figure 16:
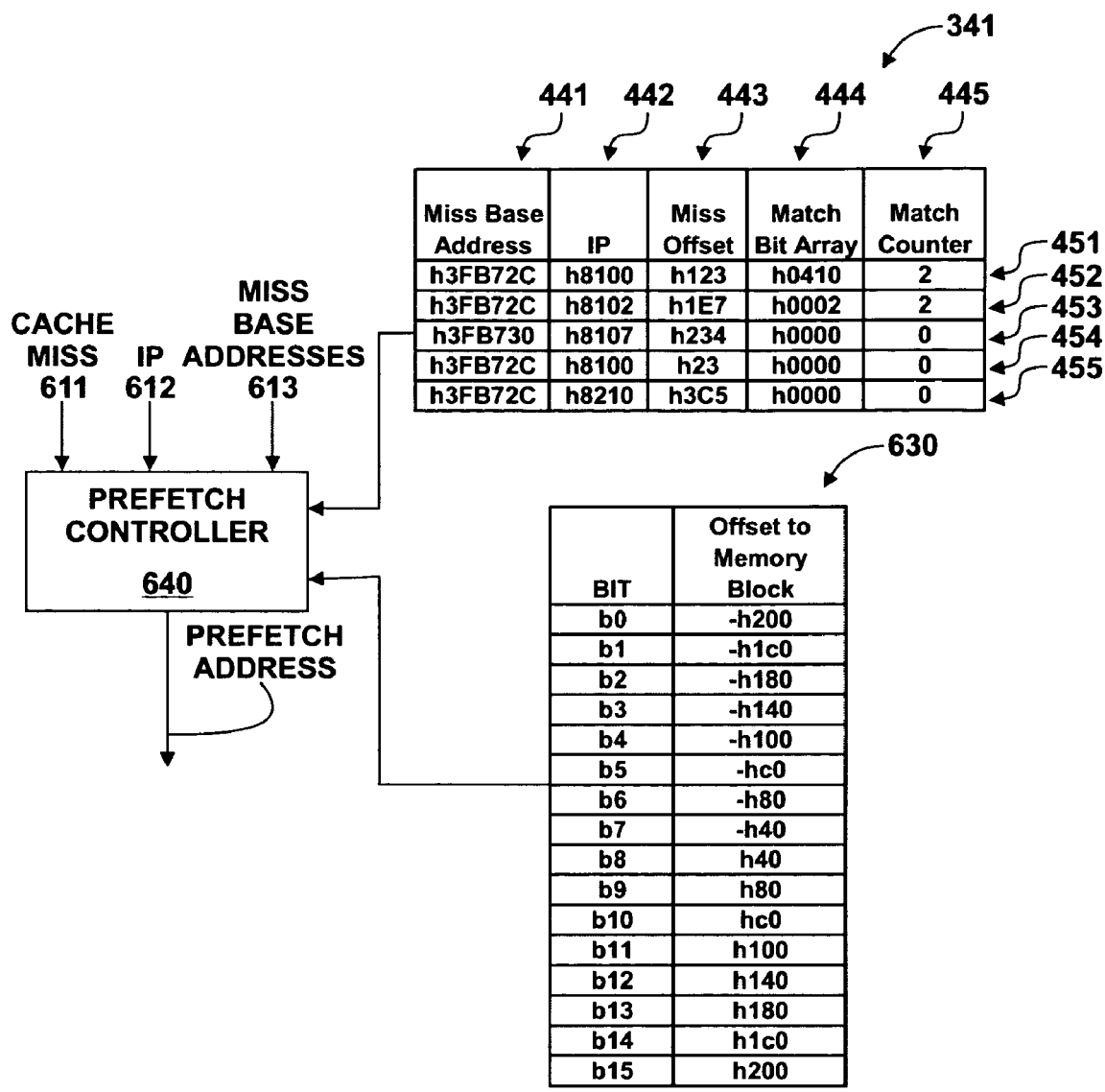
FIG. 16 illustrates another embodiment of the prefetch controller of FIG. 2 in greater detail.

Therefore, referring to FIG. 16, when the instruction having an instruction pointer value of h8100 causes a cache miss at a miss address 613, the prefetch controller 340 will provide one address value to the memory controller 350 equal to the miss address 613—the offset (−h100) that corresponds to bit b4 at table 630, and another address value to the memory controller 350 equal to the miss address 613—the offset (hC0) that corresponds to the bit b10 at table 630. These address values will result in two cache lines being prefetched by memory controller 350, assuming they are not currently in cache 360.

In accordance with a specific embodiment of the present disclosure two tables are maintained at storage location 330. One table, such as table 341, acts as an instruction history buffer to correlate addresses that result in cache misses for a sequence of executed instructions as discussed with reference to FIGS. 11-15. A second table, such as table 334 of FIG. 17, has records containing information needed by the prefetch controller 340. Columns 531-533 of FIG. 11 correspond to columns 521-523 as previously described (FIG. 10). Column 534 stores a count of the number of matches that define the prefetch information at a give row of table 334.

Figure 17:
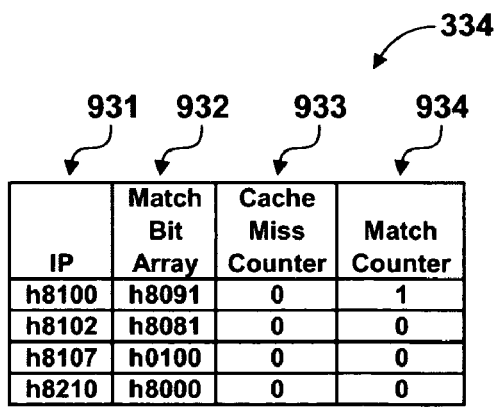
FIG. 17 illustrates tables representing specific embodiments for storing data.

In one embodiment, see FIG. 17, where only one record is maintained for each instruction pointer (IP), a record in table 334 is updated, when a record is removed from table 341 having the same IP value. The match counter information for a record in table 334 is updated by adding the match counter of table 341 to the match counter of table 334, and the match bit array of table 334 is updated by ORing the match bit array of table 341 to the match bit array at table 334.

The match counter and cache miss counter of a record can be used by prefetch control 340 to determine whether to provide prefetch information to the memory controller when a cache miss results in an IP hit in table 334. For example, if the number of times a record of table 334 is used to generate prefetch information, i.e. the cache miss counter value at column 533, is sufficiently large compared the number of matches defining the match bit array, i.e. the match counter at column 534, it will generally indicate the prefetch information stored at the record is likely to be useful. In one embodiment, the prefetch controller 340 will only generate prefetch requests based on a record when the following is true for information based on the record: (match counter)*(ratio threshold)>(cache miss counter), where the ratio threshold is a scaling value, such as in the range of 2-4. Note higher values of the ratio threshold can consume more bandwidth.

In one embodiment, table 341 can maintain a fewer number of records than table 334. For example, table 341 can contain a record for each of the most recent 32 cache misses, while table 334 can contain records for hundreds or thousands of instruction pointers. Table 334 can be updated with information being overwritten at table 341. For example, once each record of table 341 is full, a new record will be stored at table 341, causing the record containing the oldest cache miss information to be deleted. However, prior to being deleted, the information at the oldest cache miss record in table 341 can be used to store information at table 333 as previously described. Note that entries at table 334 can be periodically cleared. For example, a single pointer can be used by the device of FIG. 2 to clear records corresponding to a row of table 334 periodically, such as every 2000 cycles.

Figure 18:
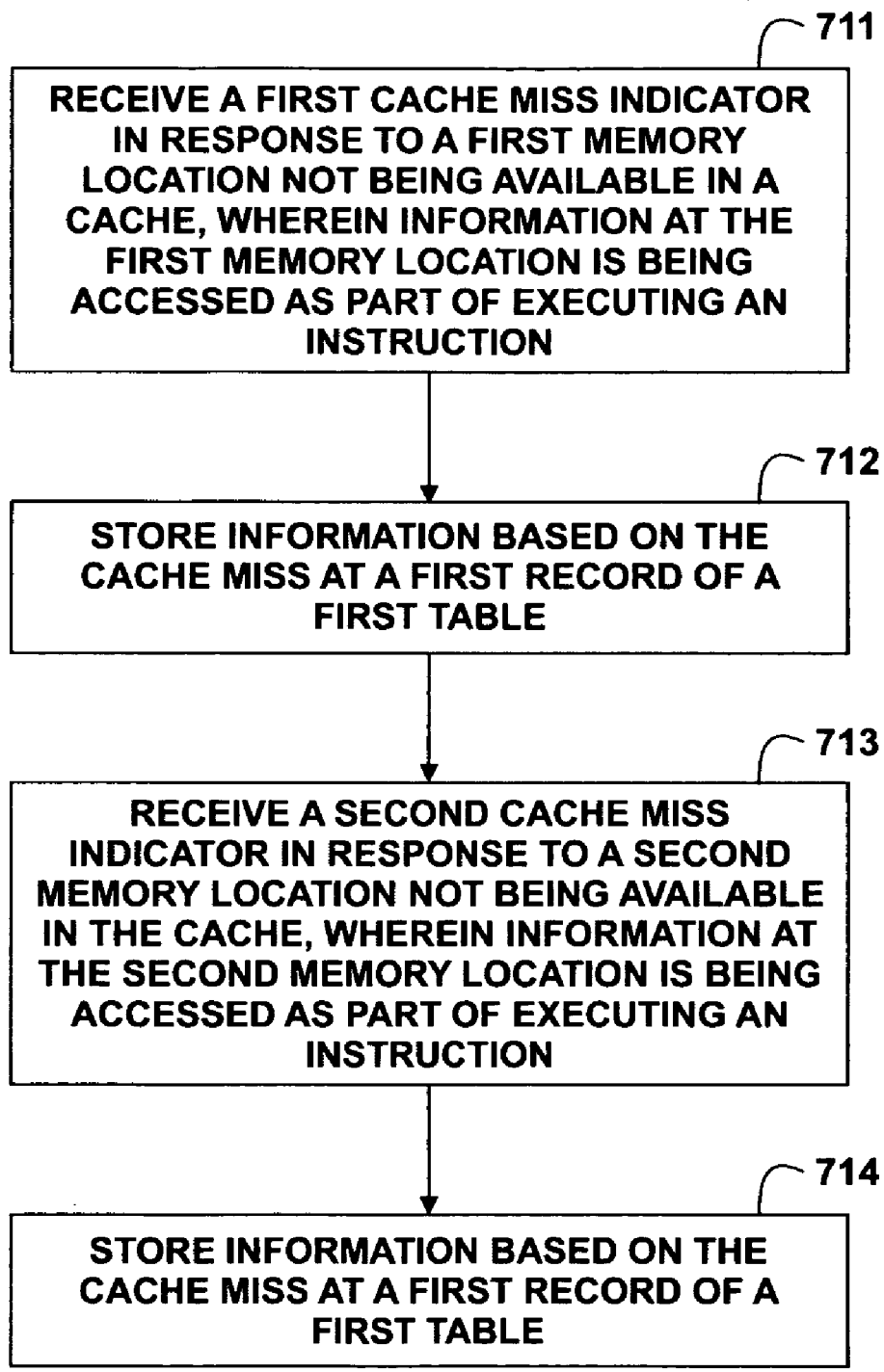
FIGS. 18 and 19 illustrate flow diagrams representing methods in accordance with the present disclosure.

FIG. 18 illustrates a method in accordance with the present disclosure. At block 711 a first cache miss indicator is received in response to a first memory location not being available in a cache, wherein information at the first memory location is being accessed as part of executing an instruction. At block 712, information based on the first cache miss is stored at a first record at a storage location in response to the first cache miss. As previously discussed, the information can include instruction information identifying a location of the first instruction, such as an instruction pointer, and memory information identifying a memory address being accessed by the instruction that resulted in the first cache miss at block 711. Examples of a record containing information based on a first cache miss as recited at block 712 include each row of tables 331-334, and 341. For example, the memory information identifying a memory location being accessed can be an address of the memory location or an offset from an aligned region, such as an address aligned region or a center block aligned region. When the memory information is an offset from an aligned region, the offset information can identify an individual byte of information or an entire block of data to be prefetched. An embodiment previously discussed includes asserting a single bit location that corresponds to one of a plurality of blocks of data associated with an aligned region. Alternatively, the memory information can include multiple values identifying a range of addresses associated with a specific instruction location.

At block 713 a second cache miss is received response to a second memory location not being available in the cache, wherein information at the second memory location is being accessed as part of executing an instruction. The instruction accessing the second memory can be either the first instruction of block 711, or a different instruction.

At block 714, information is stored based on the second cache miss. In one embodiment, when the second cache miss is the result of an address associated within an aligned region of a previous cache miss, a record associated with the previous cache miss is updated by storing additional prefetch information. For example, entries in tables 331-334, and 341 are updated in this manner in response to cache misses within an address region or a center block aligned region. Note, that tables 332-334 are updated with information from tables 331 and 341 in response to a cache miss. In an alternate embodiment, information can also be stored to create a new record in response to the second cache miss, such as described previously with respect to the entries at tables 331-334.

Figure 19:
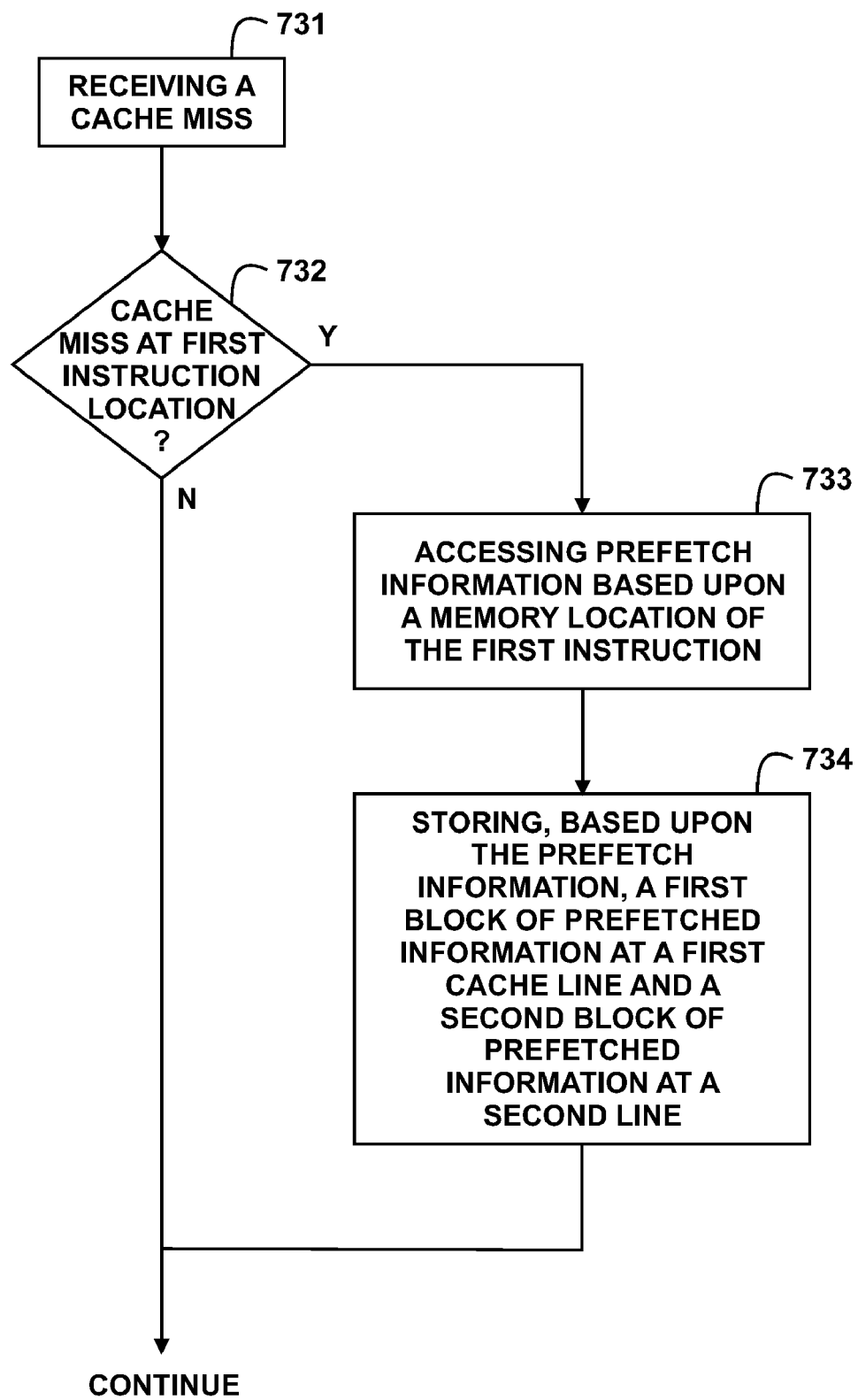

FIG. 19 illustrates a flow diagram of a method in accordance with the present disclosure. At block 731 a cache miss is received. At block 732 it is determined whether a cache miss occurs in response to accessing a first memory location for a first instruction. If so, the flow proceeds to block 733, where prefetch information is accessed based upon a memory location of the first instruction. At block 734, a block of information is stored based upon the prefetched information. For example, a block of information having the same size as a cache line can be stored at the cache line.

In the foregoing specification, principles of the invention have been described above in connection with specific embodiments. However, one of ordinary skill in the art appreciates that one or more modifications or one or more other changes can be made to any one or more of the embodiments without departing from the scope of the invention as set forth in the claims below. For example, it will be appreciated that prefetch information can include weight values for each block of information to be prefetched. For example, a block containing data that frequently results in a cache miss can be given a greater weight than other blocks of data. In addition, though the present disclosure has described cache misses generally, it will be appreciated that the present disclosure can accommodate multiple levels of cache misses. For example, training can occur with respect to L2 cache misses, while generation of prefetch information can occur with respect to L1 cache misses. It will also be appreciated that system 300 can include a translation look-aside buffer (TLB) at the integrated circuit device 301 to reduce the energy and load on a L2 TLB when virtual memory is being accessed. Various configurations of storage location 330 are also anticipated. For example, a storage location having single or multiple read write ports can be used. For example, the match bit array could be a saturating counter. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method comprising:
   receiving a first cache miss indicator in response to a first instruction accessing a first memory location, wherein the first memory location could not be found in a cache;
   in response to receiving the first cache miss indicator, storing first information at a first record, the first information comprising:
      information representing an address space location from which the first instruction was accessed; and
      a first indicator identifying a first block of memory that includes the first memory location;
   receiving a second cache miss indicator in response to a second instruction accessing a second memory location, wherein the second memory location could not be found in the cache; and
   in response to receiving the second cache miss indicator, storing second information at the first record, the second information comprising:
      a second indicator identifying a second block of memory that includes the second memory location but not the first memory location;
   wherein the relative position of the first indicator within the first record identifies the first block of memory and the relative position of the second indicator within the first record identifies the second block of memory.

2. The method of claim 1, wherein the first block of memory is of a size that is storable at a cache line, and the first and second block of memory are of the same size.

3. The method of claim 1, wherein the first indicator and the second indicator are each stored at fixed bit locations within the first record.

4. The method of claim 1, wherein storing the second information is further in response to determining that the second memory location and the first memory location are within a defined range.

5. The method of claim 4, wherein the defined range includes the plurality of blocks.

6. The method of claim 5, wherein the first indicator and the second indicator are each stored at fixed bit locations within the first record.

7. The method of claim 1, wherein storing the second information is further in response to determining that the second memory location and the first memory location are within a defined range.

8. A method comprising:
in response to a first cache miss caused at an integrated circuit by an instruction executed at a first time accessing a memory, storing first instruction address information that caused the first cache miss at a first record, the first instruction address information representing a location of memory from where the instruction executed at the first time was accessed;
in response to a second cache miss caused by an instruction executed at a second time accessing a first location of the memory, storing a first indicator at the first record, the first indicator identifying a first block of memory that includes the first location of the memory; and
in response to a third cache miss caused at the integrated circuit by an instruction executed at a third time accessing the memory, and in response to determining that the first instruction address information stored at the first record matches the instruction address information of the instruction executed at the third time, prefetching the first block of memory based upon the first indicator stored at the first record;
wherein the relative position of the first indicator within the first record identifies the first block of memory.

9. The method of claim 8 wherein prefetching the first block includes storing the first block of memory at a cache line.

10. The method of claim 8 wherein storing the first indicator includes storing information at a first fixed location of the first record.

11. The method of claim 10, wherein the first record comprises a plurality of fixed locations including the first fixed location, and each respective fixed location of the plurality of fixed locations identifies a corresponding block of memory of a plurality of blocks of memory.

12. The method of claim 11, wherein each fixed location of the plurality of fixed locations is a bit location.

13. The method of claim 11, wherein storing the first indicator is further in response to determining that the memory location that caused the first cache miss and the first memory location are within a defined range.

14. The method of claim 13, wherein the defined range includes the plurality of blocks.

15. The method of claim 14, wherein each location of the plurality of locations is a bit location.

16. The method of claim 8, wherein storing the first indicator is further in response to determining that the memory location that caused the first cache miss and the first memory location are within a defined range.

17. A device comprising:
a memory controller to provide a first cache miss indicator in response to a first instruction accessing a first memory location, and to provide a second cache miss indicator in response to a second instruction accessing a second memory location;
a prefetch training module to store first information at a first record, in response to receiving the first cache miss indicator, and to store second information at the first record, in response to receiving the second cache miss indicator,
the first information to comprise:
information representing an address space location from which the first instruction was accessed; and
a first indicator identifying a first block of memory that includes the first memory location;
the second information to comprise:
a second indicator identifying a second block of memory that includes the second memory location but not the first memory location, and
wherein the relative position of the first indicator within the first record identifies the first block of memory and the relative position of the second indicator within the first record identifies the second block of memory.

18. The device of claim 17, wherein the first block of memory is of size that can be stored at a cache line of an integrated circuit that includes the memory controller.

19. A device comprising:
a memory controller to provide a first cache miss indicator, a second cache miss indicator, and a third cache miss indicator, the first cache miss indicator provided in response to a cache miss caused by an instruction executed at a first time accessing a memory, the second cache miss indicator provided in response to an instruction executed at a second time accessing a first location of the memory, and the third cache miss indicator provided in response to an instruction executed at a third time accessing the memory;
a prefetch training module to store, at a record, instruction information and a first indicator, the first instruction information is stored in response to the first cache miss indicator and represents a location of memory from where the instruction executed at the first time was accessed, and the first indicator is stored in response to the second cache miss indicator and identifies a first block of memory that includes the first location; and
a prefetch controller to determine, in response to the third cache miss indicator, that the instruction information stored at the first record matches a location of memory from where the instruction executed at the third time was accessed, and, in response, the prefetch controller to prefetch the first block of memory based upon the first indicator, wherein the relative position of the first indicator within the first record identifies the first block of memory.

20. The device of claim 19, wherein the first block is of a size that can be stored at a cache line of an integrated circuit that includes the memory controller.

* * * * *